US012775431B2

(12) United States Patent
Kim et al.

(10) Patent No.: US 12,775,431 B2
(45) Date of Patent: Oct. 27, 2026

(54) DISPLAY DEVICE AND CONTROL METHOD THEREOF FOR CONTROLLING DISPLAY POWER MANAGEMENT MODE BASED ON INPUT SIGNAL

(71) Applicant: SAMSUNG ELECTRONICS CO., LTD., Suwon-si (KR)

(72) Inventors: Hyunseok Kim, Suwon-si (KR); Battushig Ganbold, Suwon-si (KR); Kideok Seo, Suwon-si (KR); Min Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/192,783

(22) Filed: Apr. 29, 2025

(65) Prior Publication Data

US 2025/0390264 A1 Dec. 25, 2025

Related U.S. Application Data

(63) Continuation of application No. PCT/KR2025/004956, filed on Apr. 11, 2025.

(30) Foreign Application Priority Data

Jun. 25, 2024 (KR) ........................ 10-2024-0082429

(51) Int. Cl.
*G06F 3/14* (2006.01)

(52) U.S. Cl.
CPC ...................................... *G06F 3/14* (2013.01)

(58) Field of Classification Search
CPC ......................................................... G06F 3/14
See application file for complete search history.

(56) References Cited

U.S. PATENT DOCUMENTS 5,938,770 A 8/1999 Kim
6,147,682 A 11/2000 Kim
(Continued)

FOREIGN PATENT DOCUMENTS

KR 10-0189781 B1 6/1999
KR 10-0193737 B1 6/1999
(Continued)

OTHER PUBLICATIONS

International Search Report (PCT/ISA/210) dated Jul. 11, 2025 issued by the International Searching Authority in International Application No. PCT/KR2025/004956.
(Continued)

*Primary Examiner* — David D Davis
(74) *Attorney, Agent, or Firm* — Sughrue Mion, PLLC

(57) ABSTRACT

A display device includes: a communication interface including a Display Port (DP) interface, and configured to communicate with a first external device; memory storing at least one instruction; and at least one processor operatively connected to the communication interface and the memory, and configured to control the display device, where the at least one instruction, when executed by the at least one processor, causes the display device to: in a state in which a Display Power Management (DPM) mode of the display device corresponds to a first DPM off mode, based on an input signal being received from the first external device, changing the DPM mode of the display device to a second DPM off mode; identify whether the input signal is a noise signal; and determine whether to change the DPM mode of the display device from the second DPM off mode to a DPM on mode.

19 Claims, 18 Drawing Sheets

(56) References Cited

U.S. PATENT DOCUMENTS

| | | | | |
|---|---|---|---|---|
| 7,843,677 | B2 * | 11/2010 | Kang | H04N 5/64 361/56 |
| 9,760,156 | B2 | 9/2017 | Kim et al. | |
| 10,031,710 | B2 | 7/2018 | Lee et al. | |
| 10,327,211 | B2 | 6/2019 | Lee | |
| 10,809,961 | B2 | 10/2020 | Kim et al. | |
| 11,216,234 | B2 | 1/2022 | Zheng et al. | |
| 11,228,797 | B2 | 1/2022 | Kim et al. | |
| 11,409,492 | B2 * | 8/2022 | Seo | H04N 21/4363 |
| 2009/0080134 | A1 * | 3/2009 | Kang | H04N 5/64 361/212 |
| 2009/0225062 | A1 * | 9/2009 | Naik | G09G 5/006 345/204 |
| 2021/0286578 | A1 * | 9/2021 | Seo | H04N 21/434 |

FOREIGN PATENT DOCUMENTS

| | | | |
|---|---|---|---|
| KR | 10-1379183 | B1 | 3/2014 |
| KR | 10-2016-0043477 | A | 4/2016 |
| KR | 10-2020-0025489 | A | 3/2020 |
| KR | 10-2020-0037567 | A | 4/2020 |
| KR | 10-2249689 | B1 | 5/2021 |
| KR | 10-2251701 | B1 | 5/2021 |
| KR | 10-2022-0013853 | A | 2/2022 |
| KR | 10-2024-0079734 | A | 6/2024 |

OTHER PUBLICATIONS

Written Opinion (PCT/ISA/237) dated Jul. 11, 2025 issued by the International Searching Authority in International Application No. PCT/KR2025/004956.

* cited by examiner

DISPLAY DEVICE AND CONTROL METHOD THEREOF FOR CONTROLLING DISPLAY POWER MANAGEMENT MODE BASED ON INPUT SIGNAL

CROSS-REFERENCE TO RELATED APPLICATION(S)

This application is a bypass continuation application of International Application No. PCT/KR2025/004956, filed on Apr. 11, 2025, which is based on and claims priority to Korean Patent Application No. 10-2024-0082429, filed on Jun. 25, 2024, in the Korean Intellectual Property Office, the disclosures of which are incorporated by reference herein in their entireties.

BACKGROUND

1. Technical Field

The disclosure relates to a display device and a control method thereof and more particularly, to a display device that converts a mode of an electronic device according to an input signal in a Display Power Management (DPM) off mode and a control method thereof.

2. Description of Related Art

If there is no input signal in a display device, power consumption may be reduced by converting to a Display Power Management (DPM) off mode. Here, the DPM off mode is a mode that shuts down a high energy consumption circuit of a monitor when a display is not used to save energy. The DPM off mode may be referred to as a standby mode, a sleep mode, a power saving mode, or the like.

In the related art, if the display device receives an input signal in the DPM off mode, the DPM off mode is converted to a DPM on mode even though the input signal is a noise signal, which may cause a possibility of malfunctioning.

That is, if the input signal is the noise signal, the display device should maintain the DPM off mode, but when the display device converts to the DPM on mode based on the input signal, and there may be power waste.

Therefore, there is a need for a solution to reduce malfunctions when the display device converts the DPM off mode to the DPM on mode.

SUMMARY

Aspects will be set forth in part in the description which follows and, in part, will be apparent from the description, or may be learned by practice of the presented embodiments.

According to an aspect of the disclosure, a display device may include: a communication interface including a Display Port (DP) interface, and configured to communicate with a first external device; memory storing at least one instruction; and at least one processor operatively connected to the communication interface and the memory, and configured to control the display device, where the at least one instruction, when executed by the at least one processor, causes the display device to: in a state in which a Display Power Management (DPM) mode of the display device corresponds to a first DPM off mode, based on an input signal being received from the first external device, changing the DPM mode of the display device to a second DPM off mode; identify whether the input signal is a noise signal; and determine whether to change the DPM mode of the display device from the second DPM off mode to a DPM on mode based on whether the input signal is a noise signal, and where, in a state in which the DPM mode of the display device corresponds to the second DPM off mode, the DP interface is activated.

The at least one instruction, when executed by the at least one processor, may further cause the display device to: identify whether the input signal is the noise signal based on information about an address value of an external device included in the input signal, and a DPM mode of the external device.

The at least one instruction, when executed by the at least one processor, may further cause the display device to: based on the address value of the external device not corresponding a prestored address value, or based on the DPM mode of the external device corresponding to an off mode, identify the input signal as the noise signal.

The at least one instruction, when executed by the at least one processor, may further cause the display device to: based on the input signal being the noise signal, maintain the DPM mode of the display device in the second DPM off mode; and based on the input signal not being the noise signal, change the DPM mode of the display device to the DPM on mode.

The at least one instruction, when executed by the at least one processor, may further cause the display device to: in the state in which the DPM mode of the display device corresponds to the second DPM off mode, based on a signal not being received from the first external device for a preset time, change the DPM mode of the display device from the second DPM off mode to the first DPM off mode.

The communication interface may further include an auxiliary (AUX) pin, where the at least one instruction, when executed by the at least one processor, further causes the display device to: receive a signal that includes information about the DPM mode of the first external device from the first external device through the AUX pin.

The display device may be connected to the first external device through the DP interface, where the at least one instruction, when executed by the at least one processor, further causes the display device to: when receiving an image signal from the first external device, receive the image signal through an aux-channel of the DP interface.

The communication interface may further include a plurality of interfaces including the DP interface, where, in the state in which the DPM mode of the display device corresponds to the first DPM off mode, the plurality of interfaces are deactivated, and where, in a state in which the DPM mode of the display device corresponds to the DPM on mode, the plurality of interfaces are activated.

According to an aspect of the disclosure, a display device may include: a communication interface comprising a Display Port (DP) interface, and configured to communicate with a first external device and a second external device; memory storing at least one instruction; and at least one processor operatively connected to the communication interface and the memory, and configured to control the display device, where the at least one instruction, when executed by the at least one processor, causes the display device to: in a state in which a Display Power Management (DPM) mode of the display device corresponds to a first DPM off mode, based on an input signal being received from the first external device, change the DPM mode of the display device to a second DPM off mode; identify whether the input signal is a noise signal; determine whether to change the DPM mode of the display device from the second DPM off mode to a DPM on mode based on whether the input signal is the noise signal; and determine whether to transmit the input signal to the second external device based on whether the input signal is the noise signal, and where, in a state in which the DPM mode of the display device corresponds to the second DPM off mode, the DP interface is activated.

The at least one instruction, when executed by the at least one processor, may further cause the display device to: in a state in which the DPM mode of the display device corresponds to the DPM on mode based on the input signal not being the noise signal, transmit the input signal to the second external device through the communication interface.

The at least one instruction, when executed by the at least one processor, may further causes the display device to: in the state in which the DPM mode of the display device corresponds to the second DPM off mode and the input signal is the noise signal, not transmit a signal to the second external device.

The communication interface may further include a plurality of interfaces including the DP interface, where, in the state in which the DPM mode of the display device corresponds to the first DPM off mode, the plurality of interfaces are deactivated, and where, in a state in which the DPM mode of the display device corresponds to the DPM on mode, the plurality of interfaces are activated.

According to an aspect of the disclosure, a method for controlling a display device may include: in a state in which a Display Power Management (DPM) mode of the display device corresponds to a first DPM off mode, based on an input signal being received from a first external device, changing the DPM mode of the display device to a second DPM off mode; identifying whether the input signal is a noise signal; and determining whether to change the DPM mode of the display device from the second DPM off mode to a DPM on mode based on whether the input signal is a noise signal, where, in a state in which the DPM mode of the display device corresponds to the second DPM off mode, a DP interface included in a communication interface of the display device is activated.

The identifying whether the input signal is the noise signal may include: receiving information about an address value of the first external device and a DPM mode of the first external device; and identifying whether the input signal is the noise signal based on the information about the address value of the first external device and the DPM mode of the first external device.

The determining whether to change the DPM mode of the display device may include: based on the input signal being the noise signal, maintaining the DPM mode of the display device in the second DPM off mode; and based on the input signal not being the noise signal, changing the DPM mode of the display device to the DPM on mode.

The identifying whether the input signal is the noise signal may include: based on information about an address value of the first external device corresponding to preset information, and a DPM mode of the first external device corresponding to the DPM on mode, identifying the input signal as not being the noise signal.

According to an aspect of the disclosure, a non-transitory computer readable recording medium storing computer instructions that, when executed by at least one processor of a display device, may cause the display device to: in a state in which a Display Power Management (DPM) mode of the display device corresponds to a first DPM off mode, based on an input signal being received from a first external device, change the DPM mode of the display device to a second DPM off mode; identify whether the input signal is a noise signal; and determine whether to change the DPM mode of the display device from the second DPM off mode to a DPM on mode based on whether the input signal is a noise signal, where, in a state in which the DPM mode of the display device corresponds to the second DPM off mode, a DP interface included in a communication interface of the display device is activated.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1A:
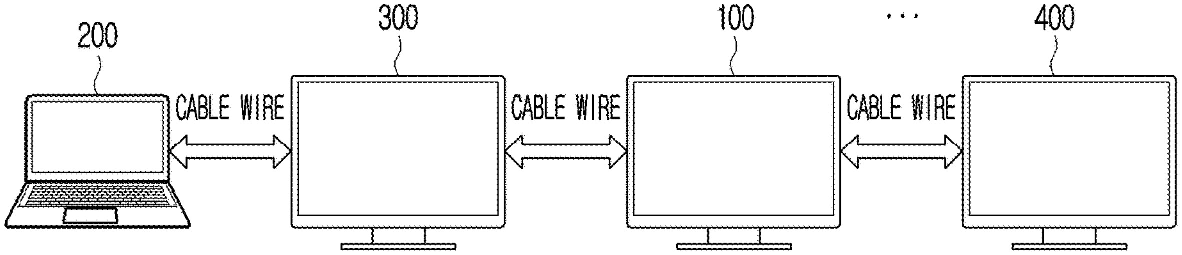
FIG. 1A is a view illustrating an example of a display system including a display device according to an embodiment.

Hereinafter, various embodiments of the disclosure are described with reference to the appended drawings. The content described in the specification is not for limiting the scope of the disclosure to a specific embodiment but it should be interpreted to include various modifications, equivalents, and/or alternatives of the embodiments. With respect to the description of the drawings, similar components may be designated by the same or similar reference numerals.

The expressions “first”, “second”, and the like used in the disclosure may be used to distinguish each component from one another regardless of any order or degree of importance. Therefore, the order or degree of importance of the relevant components is not limited by these expressions. For example, a first component may be referred to as a second component and similarly, the second component may be also referred to as the first component exchangeably without departing from the scope of the right described in the disclosure.

In the disclosure, the description that one element (e.g. a first component) is “operatively or communicatively coupled with/to” or “connected with/to” another element (e.g. a second component) should be interpreted to include a case that the one element may be directly coupled with/to the another element or a case that the one element may be coupled to the another element through the other element (e.g. a third component). In contrast, the description that one element (e.g. a first component) is "directly coupled" or "directly connected" to another element (e.g. a second component) may be interpreted such that the other element (e.g. a third component) is not present between the one element and the another element.

The terms used in the disclosure are used for describing various and are not intended to limit the scope of another embodiment. Also, a singular expression may be used for convenience of the description in the disclosure but may be interpreted as a plural expression, unless obviously differently defined in the context. Also, the terms used in the disclosure may have the same meanings as meanings generally understood by those skilled in the art. The terms defined in a general dictionary among the terms used in the disclosure may be interpreted as the same or similar meanings as or to meanings included in the context of the related art, and is not interpreted as ideal or excessively formal meanings unless obviously differently defined in the context. In some cases, despite the term defined in the disclosure, the term should not be interpreted to exclude embodiments of the disclosure.

Hereinafter, various embodiments of the disclosure are specifically described with reference to the appended drawings.

Figure 1B:
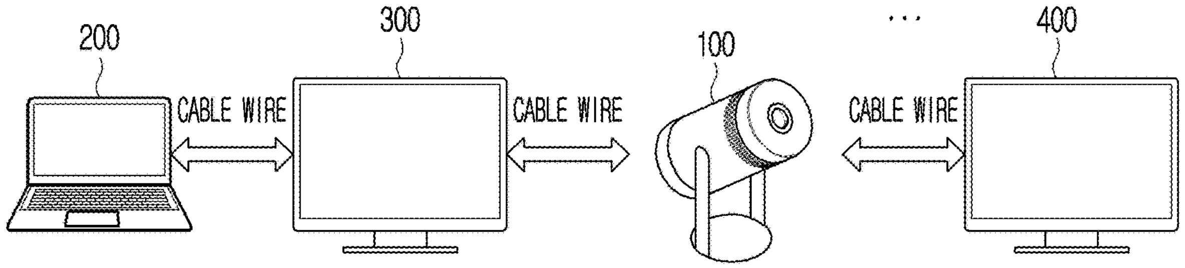
FIG. 1B is a view illustrating an example in which a display device is implemented as a projector according to an embodiment.

FIGS. 1A and 1B are views illustrating various embodiments of a display system including a display device. The display system may include an external source device 200, a first external device 300, a display device 100, and a second external device 400. Here, the external source device 200, the first external device 300, the display device 100, and the second external device 400 may be connected in a daisy chain method. The case of connecting in the daisy chain method means a case of connecting a plurality of electronic devices in series. For example, the case of connecting in the daisy chain method may mean that the external source device 200 and the first external device 300 are connected in series, the first external device 300 and the display device 100 are connected in series, and the display device 100 and the second external device 400 are connected in series.

When a plurality of display devices are connected in the daisy chain method, the plurality of display devices may be the same type of display device. The same type of display device may mean that specifications of the display devices are the same. For example, if a specification value of the first external device 300 is the same as a specification value of the display device 100, each display device may be considered as the same display device. However, it is merely an example, the plurality of display devices may be of different types.

The display device 100 is a device for displaying an image, and may include a television, a computer monitor, digital signage, or the like but is not limited thereto. The display device 100 may be a display device that is used at home, in school, or the like or is used in an industrial site such as a factory or is used in a medical institution, or the like. In some examples, the display device 100 may be used for various purposes and uses such as a broadcast viewing, image playback such as a game, a movie, or the like, traffic control and monitoring, disaster prevention, or display of an advertising image. The display device 100 may display one image together with other external devices (e.g. the first external device 300 and the second external device 400), but it is merely an example, and each of the display device 100 and the other external devices may display a plurality of images.

As shown in FIG. 1A, the description is made hereinafter under the assumption that the external source device 200, the first external device 300, and the second external device 400 are also display devices different from the display device 100, for convenience of the description. However, the display device 100, the external source device 200, the first external device 300, and the second external device 400 are not limited to the display devices.

The external source device 200 is illustrated as a display device in FIGS. 1A and 1B, but it is merely an example, and is not limited to the display device. That is, the external source device 200 may be implemented as not only a display device but also a laptop PC, a tablet PC, a notebook PC, or a monitor.

According to an embodiment of the disclosure, the display device 100 may operate in a first DPM off mode while an input signal is not received from the outside. If the display device 100 receives the input signal from the first external device 300 while operating in the first DPM off mode, it may determine whether the received input signal is a general signal (e.g., a WAKE-UP signal) or a noise signal. For example, if the display device 100 receives the input signal from the first external device 300 while operating in the first DPM off mode, the display device 100 may convert to a second DPM off mode regardless of a type of input signal.

Here, the first DPM off mode means a mode in which power is supplied only to a minimum essential component(s) for an operation standby of a display (e.g. an IR receiver), and power supply is shut off or reduced from the other components, such as a heater that consumes large power or a deflection integrated circuit (IC). That is, the first DPM off mode may mean a conventional DPM off mode. The second DPM off mode may be a mode that activates a DP interface in the first DPM off mode. Here, the second DPM off mode may be referred to as various terms such as a fake DPM off mode or a preliminary DPM off mode.

The display device 100 may determine whether the input signal is a general signal or a noise signal while in the second DPM off mode. Further, the display device 100 may continuously maintain the second DPM off mode according to a determination result, or convert to the DPM on mode. The detailed operation of the disclosure is specifically described hereinafter.

According to the content shown in FIG. 1A, a plurality of display devices 200, 300, 100, 400 are connected in a daisy chain method, so that they are shown in a state of being connected by a wired cable, but this is merely an example, and it is also possible to connect a plurality display devices through a wireless communication interface.

In FIG. 1A, it is described that the electronic device 100 is the display device, but it is merely an example, and the electronic device 100 may be implemented as a projector shown in FIG. 1B.

That is, as shown in FIG. 1B, an external source device 200, a first external device 300, a projector 100, and a second external device 400 may be connected in a daisy chain method. If the electronic device 100 implemented as the projector has the same specification value as those of the first external device 300 and the second external device 400, or the electronic device 100 implemented as the projector supports the same interface (e.g. DisplayPort) as those of the first external device 300 and the second external device 400, they may be connected in the daisy chain method.

If the electronic device 100 is implemented as the projector, the projector may include a display part. The projector may be implemented as a projector including an embedded display.

For example, if the projector is connected to the first external device 300, it may receive an input signal from the first external device 300 and project an image through the embedded display.

Figure 2:
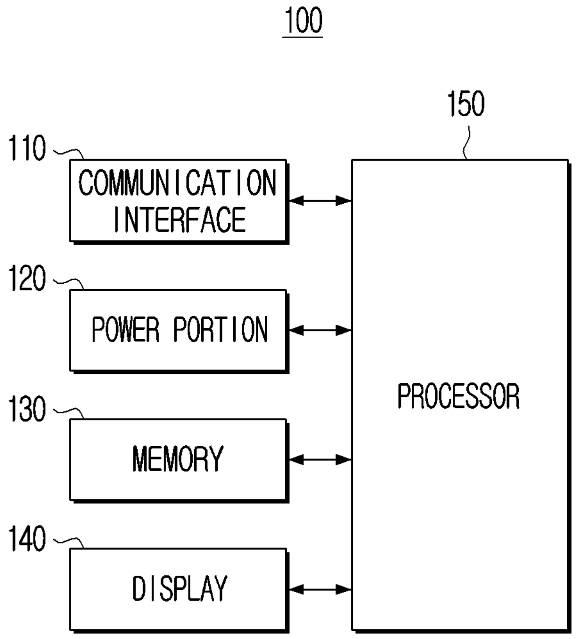
FIG. 2 is a block diagram illustrating a configuration of a display device according to an embodiment.

FIG. 2 is a block diagram illustrating a configuration of a display device according to one or more embodiments.

As shown in FIG. 2, the display device 100 may include a communication interface 110, a power portion 120, memory 130, a display 140, and a processor 150. Meanwhile, the configuration of the display device 100 shown in FIG. 1A is merely an example, and it is obvious that components may be added or deleted depending on a type of display device 100.

According to an embodiment of the disclosure, the display device 100 may be implemented as a user terminal such as a laptop PC, a smart phone, a tablet PC, a notebook PC, or a TV, and may be implemented as various devices such as a home appliance and an IoT device.

The communication interface 110 may include at least one circuit and perform communication with various types of external devices or servers.

The communication interface 110 may include a DP interface, and the display device 100 and the at least one external device 300, 400 may be connected through the DP interface. For example, the DP interface may include a DisplayPort Receiver (DP RX) and a DisplayPort Transmitter (DP TX). The display device 100 may receive or transmit a signal from/to the first external device 300 and the second external device 400 through the DP RX and a DP TX. For example, the display device 100 may receive an input signal from the first external device 300 through the DP RX. A repeater IC among an integrated circuit of the display device 100 may transmit the received signal to the second external device 400 connected to the display device 100 through the DP TX.

However, the above description is merely an example, and the communication interface 110 may include various communication interfaces such as a Bluetooth Low Energy (BLE) interface, a Wi-Fi communication interface, a cellular communication interface, a 3rd Generation (3G) mobile communication interface, a 4th Generation (4G) mobile communication interface, a 4G Long Term Evolution (LTE) communication interface, or a 5G mobile communication interface besides the DP interface.

The communication interface 110 may include a wire communication interface for inputting or outputting at least one of an audio signal or an image signal. As an example, the communication interface 110 may be a High Definition Multimedia Interface (HDMI), but it is merely an example, and it may be any one interface of a Mobile High-Definition Link (MHL), a Universal Serial Bus (USB), Thunderbolt, a Video Graphics Array (VGA) port, a RGB port, D-subminiature (D-SUB), or a Digital Visual Interface (DVI). According to an embodiment, the communication interface 110 may include a port which inputs or outputs only the audio signal and a port which inputs or outputs only the image signal as separate ports or may be implemented as one port which inputs or outputs all of the audio signal and the image signal.

Figure 3:
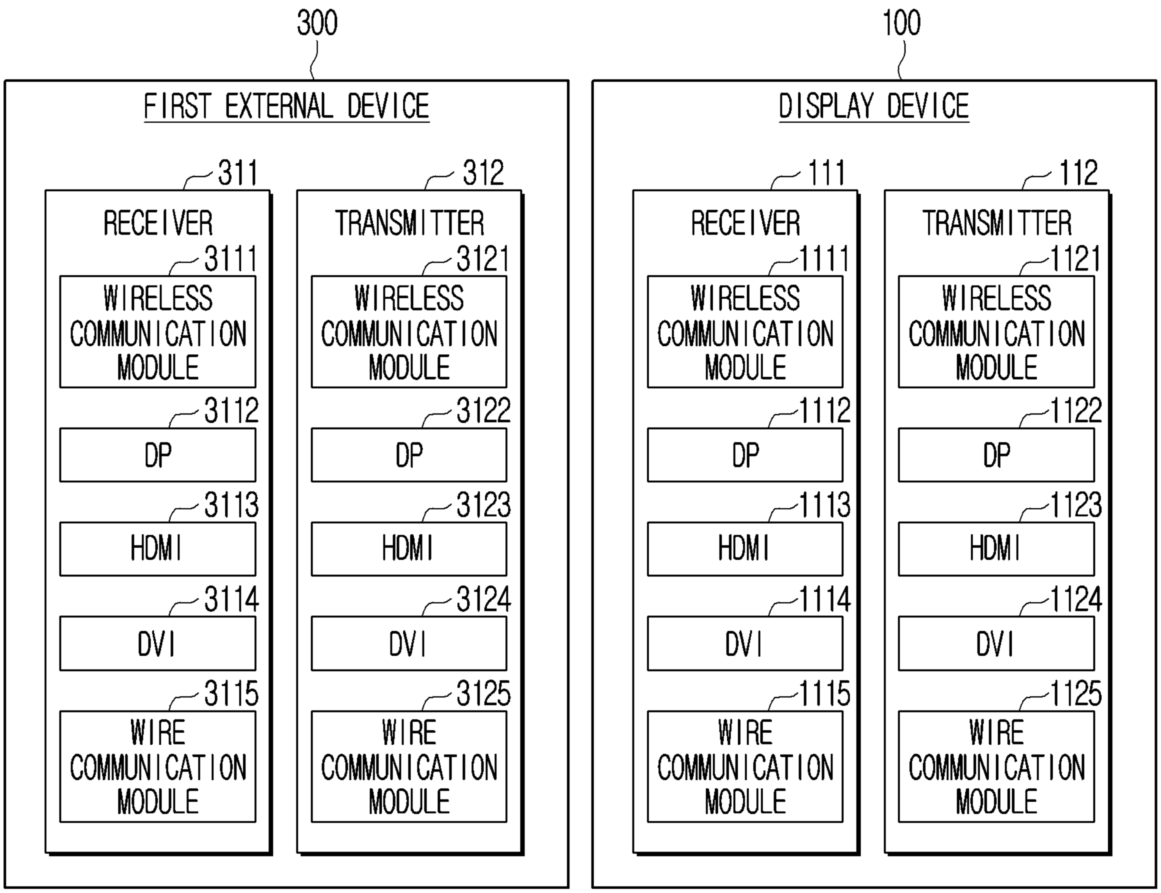
FIG. 3 is a view illustrating a communication interface among a configuration of a display device according to an embodiment.

FIG. 3 is a view illustrating a communication interface among a configuration of a display device according to an embodiment. The communication interface 110 may include a receiver 111 and a transmitter 112. The communication interface 110 may receive information about another device through the receiver 111 (e.g. identification information of the external electronic device or information about a DPM state) and may transmit at least one of a control signal, an audio signal, or an image signal to the another electronic device through the transmitter 112.

With reference to the content shown in FIG. 3, a physical interface may include physical interfaces corresponding to various types of interface technologies such as a wireless communication module 1111, 1121, a DP 1112, 1122, a HDMI 1113, 1123, DVI 1114, 1124, or a single display interface (UDI).

Here, the wireless communication module 1111, 1121 may mean a communication module which may perform one or more mobile communication technologies or short-range communication technologies, and the wireless communication module may include one or more communication chips and one or more antennas.

The DP 1112, 1122 among the physical interfaces is a digital interface standard for transmitting video and audio signals between display devices. The DP is a standard developed by Video Electronics Standards Association (VESA) and may support a high resolution digital display. The display device 100 and the first external device 300 may be connected by the DP to transmit video and audio signals between the display devices and information about a DPM mode of the display devices.

The HDMI 1113, 1123 is an interface which may transmit digital video and audio signals at the same time. The HDMI may transmit a high definition video and a high quality audio sound with one cable. The electronic device 100 may receive various video or audio sound through the first external device 300 and the HDMI 1113, 1123, and the electronic device 100 may transmit various video or audio sound to the second external device 400 though the HDMI 1113, 1123.

The DVI 1114, 1124 is a video interface standard used for connecting a computer and a display device. The DVI 1114, 1124 may support both of a digital signal and an analog signal and may be used for transmitting a high resolution video in a digital method. The electronic device 100 may be connected to the first external device 300 or the second external device 400 through the DVI 1114, 1124 to receive or transmit digital and analog signals.

The wire communication module 1115, 1125 may be a module which communicates with an external device wiredly. For example, the wire communication module 1115, 1125 may include at least one of a Local Area Network (LAN) module, an Ethernet module, a pair cable, a coaxial cable, a fiber optic cable, or an Ultra Wide-Band (UWB) module.

The description is made based on the receiver 111 and the transmitter 112 of the display device 100, but the receiver 111 and the transmitter 112 of the display device may similarly apply to a wireless communication module 3111, a DP 3112, a HDMI 3113, a DVI 3114, a wire communication module 3115 included in a receiver 311 of the first external device 300, and a wireless communication module 3121, a DP 3122, a HDMI 3123, a DVI 3124, a wire communication module 3125 included in a transmitter 312 of the first external device 300.

The power portion 120 may convert the display device from a DPM off mode to a DPM on state. The DPM means a standard for managing power supply of the display device such as a video monitor. In accordance with the DPM, the display device 100 may be in a DPM on state or a DPM off state. Degree of power usage and a return time may be different for each state. Meanwhile, the DPM off mode (or the DPM off state) may be referred to as a standby mode, a sleep mode, a power saving mode, or the like, and the DPM on mode (or the DPM on state) may be referred to as a general mode, a normal mode, or the like.

The memory 130 may store an Operating System (OS) for controlling an overall operation of components of the display device 100 and instructions or data related to the components of the display device 100.

The memory 130 may be implemented as various forms such as volatile memory (e.g. dynamic RAM (DRAM), static RAM (SRAM), synchronous dynamic RAM (SDRAM), etc.) or non-volatile memory (e.g. one time programmable ROM (OTPROM), programmable ROM (PROM), erasable and programmable ROM (EPROM), electrically erasable and programmable ROM (EEPROM), mask ROM, flash ROM, flash memory (e.g. NAND flash memory, NOR flash memory, etc.), a hard drive, or a solid state drive (SSD)).

The display 140 may display various information. The display device 100 may operate in the DPM on mode or the DPM off mode. If the display device 100 is in the DPM on mode, the display 140 may display various information. Meanwhile, if a mode of the display device 100 is the DPM off mode, the display 140 may display a single color screen (e.g. a black screen), that is, it may display a screen in which the display is in a power saving mode.

Further, the display 140 may be implemented as a Liquid Crystal Display (LCD) Panel, an Organic Light Emitting Diode (OLED), or the like but is not limited thereto. The display may be implemented as a flexible display, a transparent display, or the like.

The processor 150 may include one or more processors. The one or more processors may include one or more of a Central Processing Unit (CPU), a Graphics Processing Unit (GPU), an Accelerated Processing Unit (APU), a Many Integrated Core (MIC), a Digital Signal Processor (DSP), a Neural Processing Unit (NPU), a hardware accelerator, or a machine learning accelerator. The processor 150 may control one or any combination of other components of the electronic device and perform an operation related to communication or data processing. The one or more processors may execute one or more programs or instructions stored in the memory. For example, the one or more processors may perform a method according to an embodiment of the disclosure by executing one or more instructions stored in the memory.

The one or more processors may be implemented as a single core processor including one core and may be implemented as one or more multi core processors including a plurality of cores (e.g. homogeneous multicores or heterogeneous multicores). If the one or more processors are implemented as a multi core processor, each of the plurality of cores included in the multi core processor may include processor internal memory such as cache memory and on-chip memory, and a common cache shared by the plurality of cores may be included in the multi core processor. Each of the plurality of cores included in the multi core processor (or part of the plurality of cores) may read and perform program instructions for independently implementing a method according to an embodiment of the disclosure and, may read and perform program instructions for implementing a method according to various embodiments of the disclosure in connection with all (or part) of the plurality of cores.

The processor 150 may operate the display device 100 in the first DPM off mode by executing at least one instruction stored in the memory 130. If an input signal is received from the first external device 300, the processor 150 may convert a mode of the display device 100 to the second DPM off mode. The processor 150 may identify whether the input signal is a noise signal. The processor 150 may determine whether to convert the second DPM off mode to a DPM on mode based on a result of the identification.

Hereinafter, the operation of the display device 100 controlled by the processor 150 is described with reference to FIGS. 4 to 8.

Figure 4:
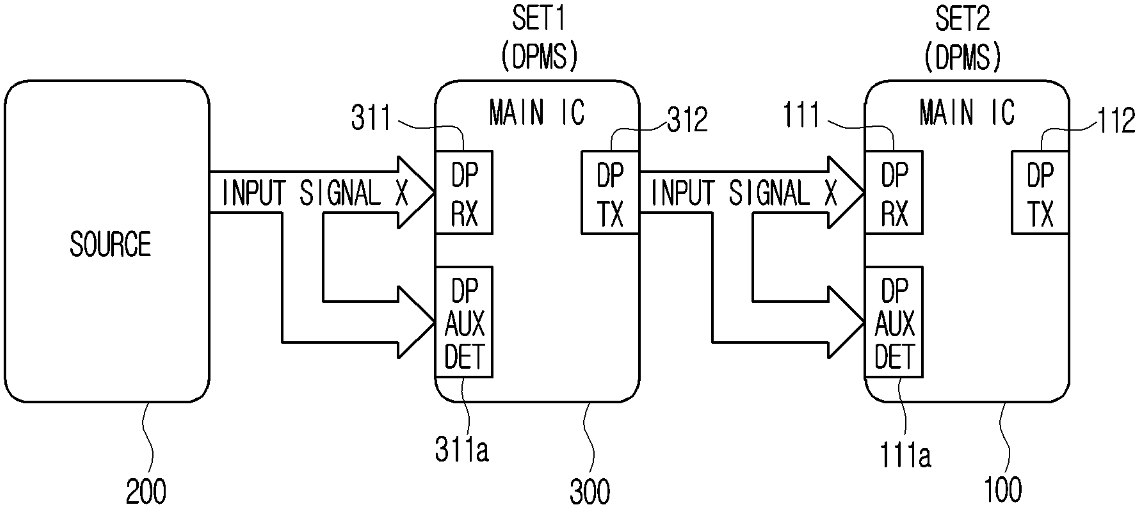
FIG. 4, FIG. 5, FIG. 6, FIG. 7, and FIG. 8 are views illustrating operations of a display device and external devices connected in a daisy chain method according to one or more embodiments.

In advance, as shown in FIG. 4, an external source device 200, a first external device 300, and a display device 100 may be connected in a daisy chain method. The case of connecting in the daisy chain method means a case that the external source device 200 and the first external device 300 are connected, and the first external device 300 and the display device 100 are continuously connected. Here, the first external device 300 may receive a signal from the external source device 200, and the first external device 300 may continuously transmit the received signal to the electronic device 100.

FIGS. 4 to 7 shows devices of the external source device 200, the first external device 300, and the display device 100, but it is merely an example, and four or more electronic devices may be connected in the daisy chain method to transmit a signal.

As shown in FIG. 4, if the external source device 200 or the first external device 300 is in a first DPM off mode (e.g. Display Power Management State (DPMS)), the display device 100 may also operate in the first DPM off mode. That is, the display device 100, if an input signal is not transmitted from the first external device 300, may maintain the first DPM off mode. Here, in the first DPM off mode, a plurality of communication interfaces of the display device 100 may be deactivated.

Figure 5:
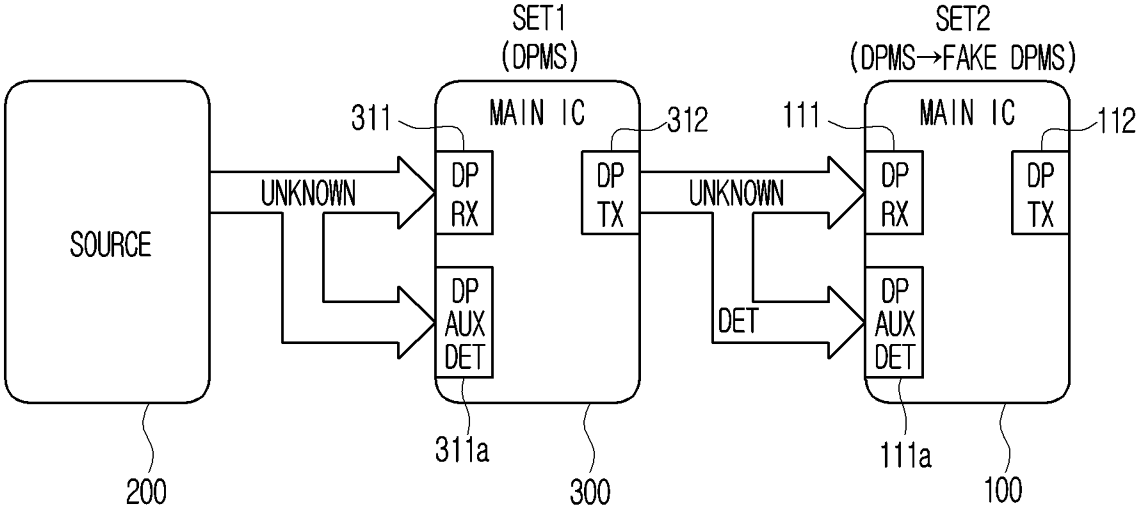

As shown in FIG. 5, if the display device 100 receives the input signal, the display device 100 may convert to a second DPM mode (e.g. FAKE DPMS). The second DPM off mode means a mode in which the display device 100 activates a DP interface in the first DPM off mode. That is, if the display device 100 converts the first DPM off mode to the second DPM off mode, the DP interface may be activated among the communication interface 110 of the display device 100. Therefore, the display device 100 may receive information from the first external device 300 through an auxiliary (AUX) channel among the DP interface.

Here, the AUX channel among the DP interface is a half-duplex bidirectional channel used for link management and device control. If the AUX channel is activated, the display device 100 may analyze a state of the external device connected by the AUX channel and Display Port Configuration Data (DPCD). As an example, the state of the external device may mean information such as a DPM mode of the external device. If the AUX channel is activated among the DP interface, the display device 100 may obtain information about whether the external device is the first DPM off mode, the second DPM off mode, or the DPM on mode.

Also, the display device 100 may obtain information about the DPCD through the AUX pin. The DPCD means information of the external device for communication through the DP interface among communication interfaces. Here, the information of the external device may mean identification information of the external device (e.g. specification information, a product name, an address value, etc.) and information about the DPM mode of the external device.

Figure 6:
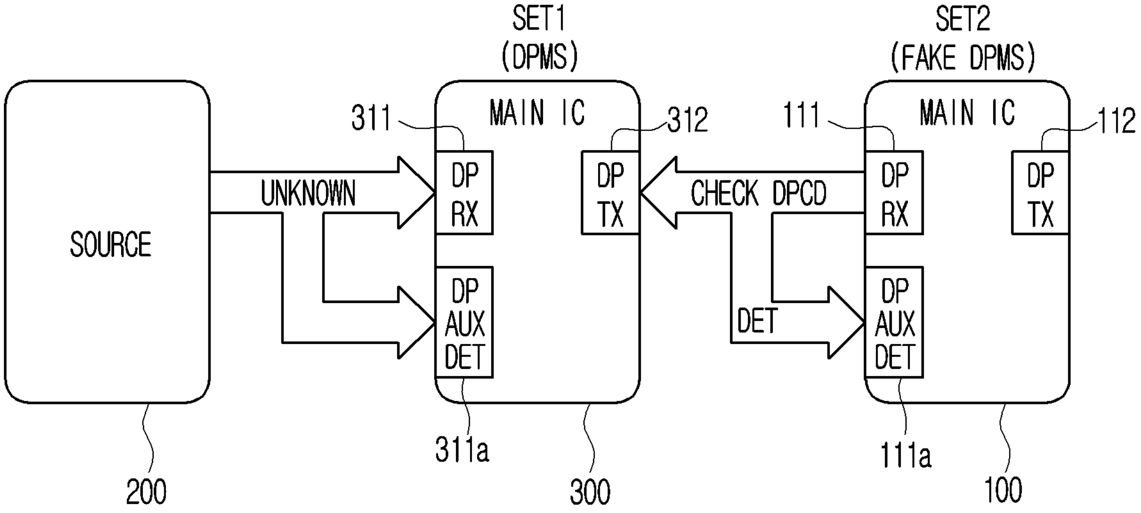

As shown in FIG. 6, if the display device 100 is converted to the second DPM off mode, the display device 100 may determine whether a signal received from the first external device 300 is a noise signal. The display device 100 may identify whether the input signal is the noise signal based on information about an address value of the external device included in the input signal and the DPM mode of the external device. For example, the display device 100, if determining that the address value of the external device does not match a prestored address value corresponding to the first external device 300 or the DPM mode of the external device is in an off state, may identify that the input signal is the noise signal.

As an example, the communication interface 110 of the display device 100 may include an AUX pin 111*a*. Here, the display device 100 may receive a signal including information about the DPM mode of the first external device 300 through the AUX pin 111*a* from the first external device 300.

The display device 100 may use the information about the address value of the external device and the information about the DPM mode of the external device to determine whether the signal received from the first external device 300 is the noise signal. For example, if it is determined that the information about the address value of the first external device 300 does not match the information about the address value of the external device among information included in the signal received by the display device 100, or the information about the DPM mode of the first external device is in the first DPM off mode or the second DPM off mode, the display device 100 may determine the received signal is the noise signal.

In the signal received by the display device 100 from the first external device 300, if the information about the address value of the first external device 300 matches the information about the address value of the preset external device, and the DPM mode of the first external device is in the DPM on mode, the display device 100 may determine that the input signal is a signal that is not the noise signal (e.g. a WAKE-UP signal). Here, if the display device 100 is in the first DPM off mode or the second DPM off mode, it may convert to a DPM on mode. When the display device 100 is in the DPM on mode, if the received input signal is a signal that is not the noise signal, the DPM on mode may be maintained.

If the display device 100 is in the second DPM off mode, the display device 100 may obtain information about an address value of the external device in a specific address and a mode of the external device through the AUX channel. The display device 100, after obtaining information about a specific address value, may obtain information about a specification of the external device from the specific address value. The information about the specification may mean a characteristic of the external device.

Figure 7:
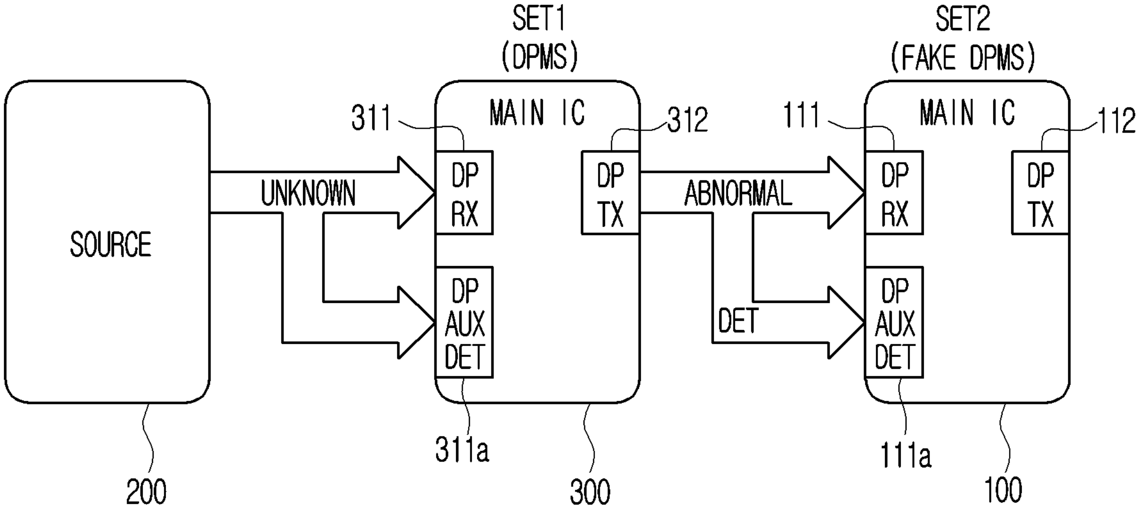

As shown in FIG. 7, the display device 100, if an input signal corresponds to a noise signal, maintains the second DPM off mode. In this case, the display device 100, after a preset time (e.g. 60 seconds) is elapsed, may convert to the first DPM off mode again as shown in FIG. 4.

Figure 8:
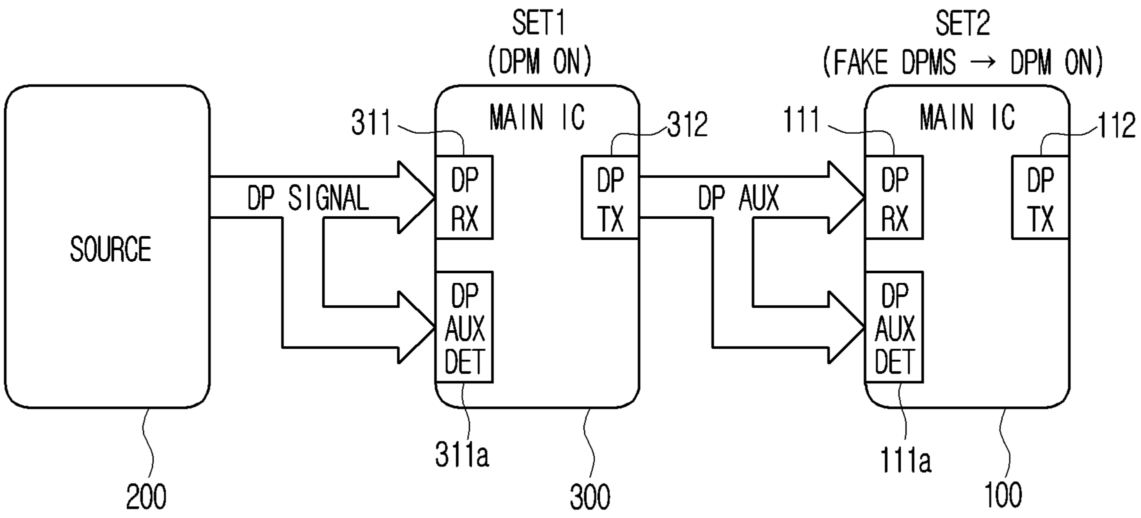

The display device 100 may determine that the received signal is not the noise signal. In this case, the display device 100 may be controlled to convert to the DPM on mode as shown in FIG. 8. In the DPM on mode, all communication interfaces of the display device 100 may be activated.

Figure 9:
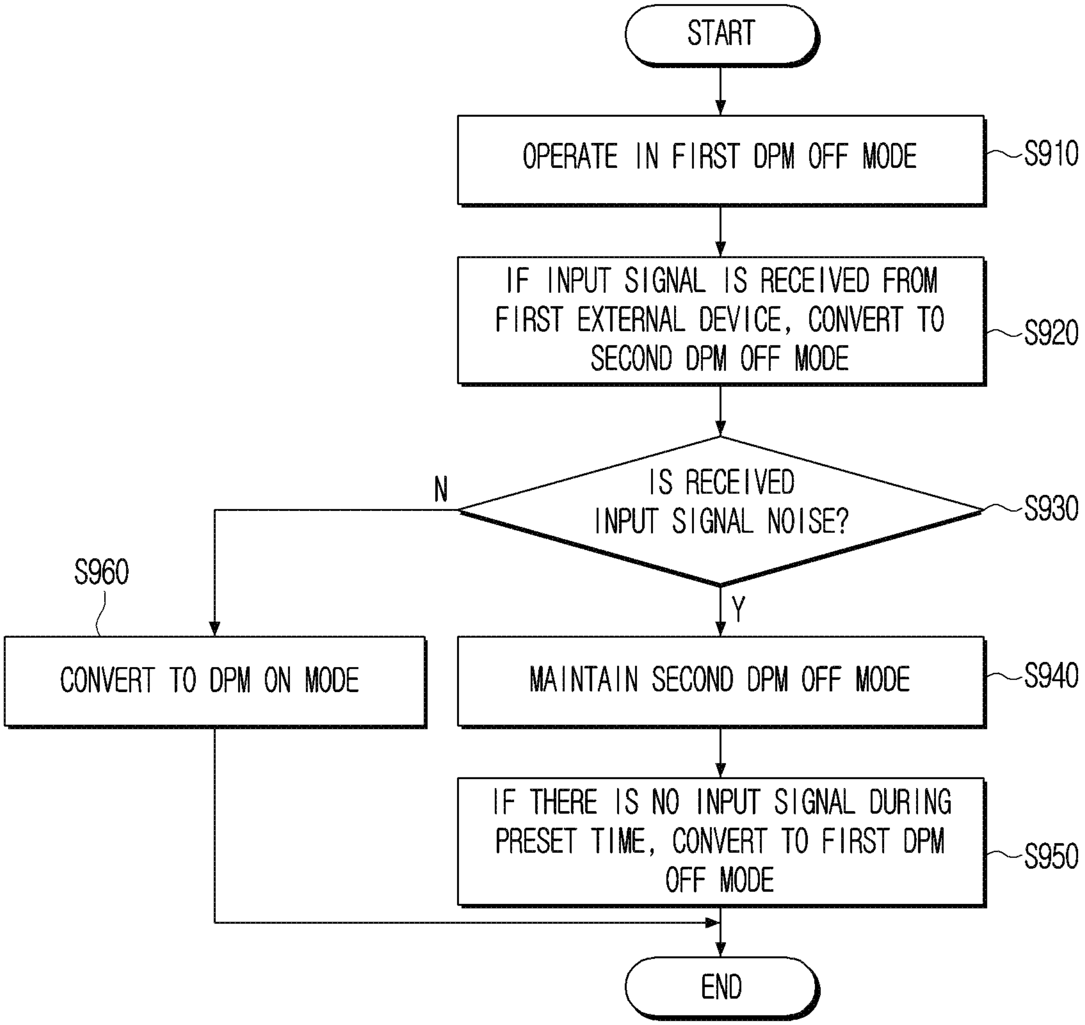
FIG. 9 is a flow chart illustrating an example illustrating an operation of the display device in accordance with an input signal according to an embodiment of the disclosure.

FIG. 9 is a flow chart illustrating an operation of a display device in accordance with a received signal according to an embodiment.

The display device 100 may operate in a first DPM off mode (S910). Here, the communication interface 110 of the display device 100 may be in a deactivated state.

Here, if an input signal is received from a first external device 300, the display device 100 may convert to a second DPM off mode (S920). The display device 100 may convert to the second DPM off mode regardless of whether the input signal is a noise signal.

The display device 100 may determine whether the received input signal is a noise (S930). The display device 100 may determine whether the input signal is the noise signal based on information about an address value of an external device and a DPM on/off mode of the external device among information included in the input signal received through the DP interface during the second DPM off mode.

The display device 100, if the received input signal corresponds to the noise, may maintain the second DPM mode (S940). When the display device 100 is in the second DPM off mode, if there is no input signal from the first external device during a preset time, the display device may convert to the first DPM off mode (S950). To reduce power consumption, the display device 100, if an additional input signal is not received from the first external device during a preset time (e.g. 60 seconds), may convert the second DPM off mode to the first DPM off mode.

Meanwhile, the display device 100, if the received input signal does not correspond to the noise, may convert to the DPM on mode (S960). That is, in information included in the input signal received by the display device 100, if the address value of the external device matches the address value preset by the display device 100, and a DPM state of the first external device corresponds to the DPM on mode, the display device 100 may determine that the received input signal does not correspond to the noise signal. In this case, the display device 100 may convert the second DPM off mode to the DPM on mode.

Meanwhile, it is described in the aforementioned embodiment that the display system includes the external source device 200, the first external device 300, and the display device 100, but it is merely an example, and the display system may be implemented in a different type of daisy chain method. With respect to the above, the description is made with reference to FIGS. 10 to 16.

Figure 10:
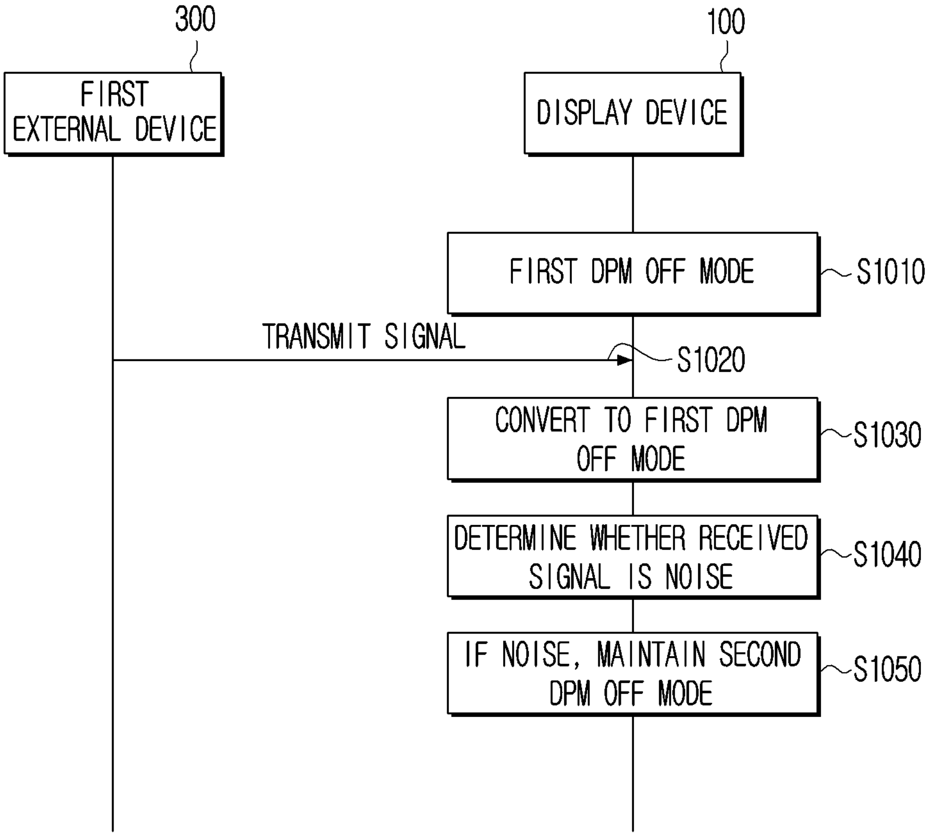
FIG. 10, FIG. 11, FIG. 12, FIG. 13, FIG. 14, FIG. 15, and FIG. 16 are sequence diagrams illustrating operations of a display device and at least one external device connected in a daisy chain method according to one or more embodiments.

FIG. 10 is a sequence diagram illustrating an operation of the first external device 300 and the display device 100 when the display device 100 and the first external device 300 are connected in the daisy chain method, according to an embodiment of the disclosure. Here, the first external device 300 may be an external source device.

The display device 100 may be in a first DPM off mode (S1010).

The first external device 300 may transmit a signal to the display device 100 (S1020).

The display device 100, if an input signal is received from the first external device 300, may convert to a second DPM off mode (S1030).

The display device 100 may determine whether the received signal is a noise during the second DPM off mode (S1040). For example, the display device 100 may determine whether the received signal is a noise based on information about an address value of the first external device 300 and a DPM mode of the first external device 300 included in the received signal.

The display device 100, if the received signal is a noise, may maintain the second DPM off mode (S1050). That is, if the signal received by the display device 100 does not correspond to a WAKE-UP signal, it may maintain the second DPM off mode to save power. Meanwhile, if the preset time is elapsed, the display device 100 may convert the second DPM off mode to the first DPM off mode.

Figure 11:
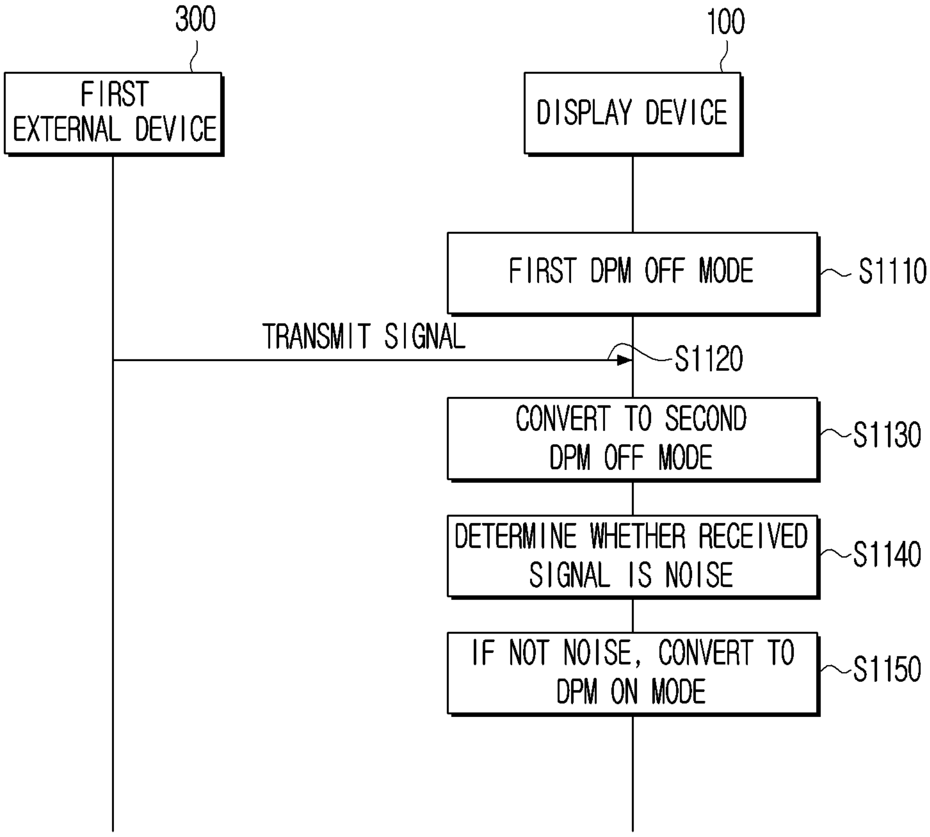

According to an embodiment of the disclosure, FIG. 11 is a sequence diagram for illustrating an operation of the first external device 300 and the display device 100 when the display device 100 and the first external device 300 are connected in the daisy chain method. Meanwhile, the description of the steps S1110 to S1140 of FIG. 11 is the same as that of the steps S1010 to S1040 of FIG. 10, and thus the overlapped description is omitted.

That is, a display device 100, if a received signal is not a noise, may convert to a DPM on mode (S1150). For example, if an address value of an external device included in an input signal matches an address value of the first external device 300, and a mode of the first external device 300 is a DPM on mode, the display device 100 may determine that the input signal is not the noise and convert to the DPM on mode.

Figure 12:
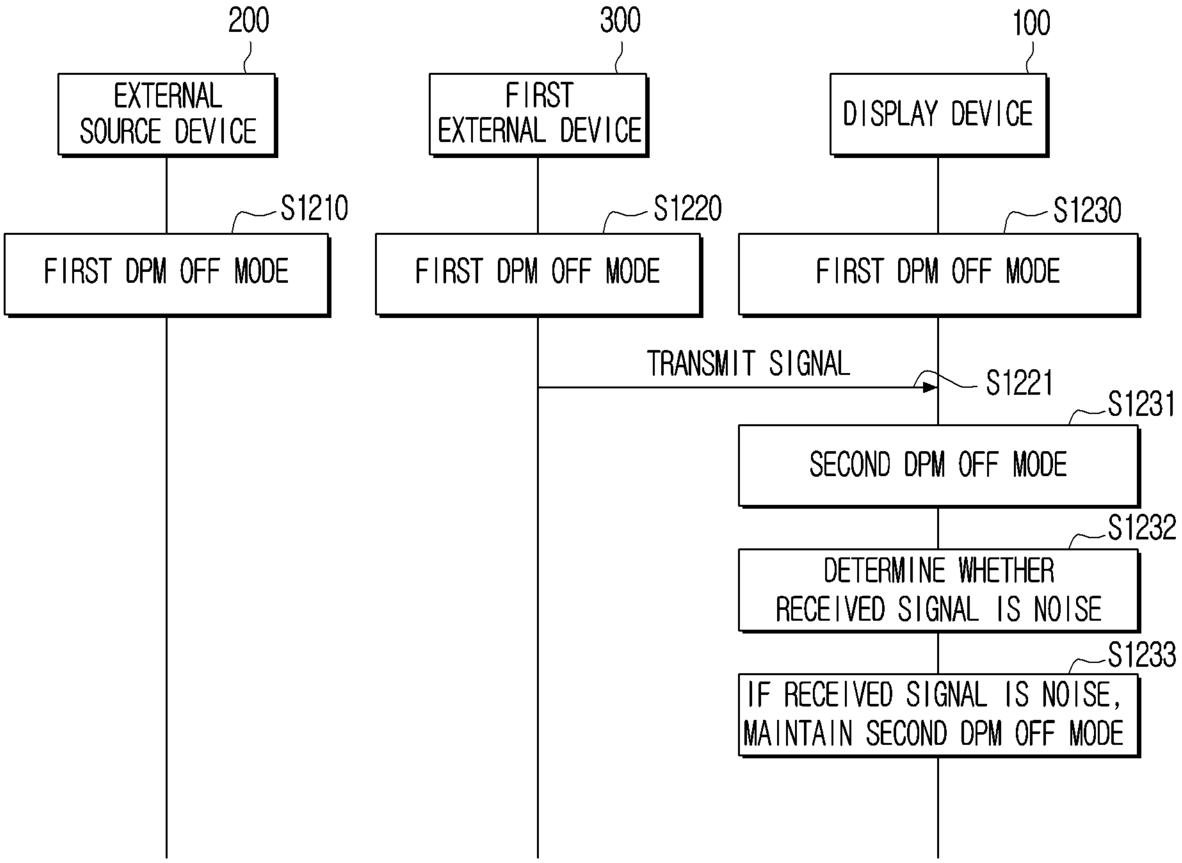

FIG. 12 is a sequence diagram illustrating operations of a display device and at least one external device connected in a daisy chain method according to various embodiments.

An external source device 200 may be in a first DPM off mode (S1210). Here, the external source device 200 corresponds to a first DPM off mode, and thus does not transmit a signal to the first external device 300. The first external device 300 may also maintain the first DPM off mode (S1220). Even though the first external device 300 is in the first DPM off mode, a signal may be transmitted to a display device 100 (S1221). Here, the display device 100 may maintain the first DPM off mode (S1230). If the display device 100 receives an input signal from the first external device 300, the display device 100 may convert to a second DPM off mode (S1231). The display device 100 may convert to the second DPM off mode to activate a DP interface among communication interfaces and receive a signal from the first external device 300 through an AUX channel. Here, the display device 100 may determine whether the received signal is a noise (S1232). Even though an address value of the first external device 300 included in the input signal received from the first external device 300 matches a prestored address value, the display device 100 may determine that the received signal is a noise because the external source device 200 corresponds to a first DPM off mode. Here, the display device 100 may determine DPM modes of the external source device and the first external device. That is, when all the DPM modes of the external source device 200 and the first external device 300 are DPM on modes, it may be determined that "the DPM mode of the external device is the DPM on mode." Upon determining a noise, the determination may be made such that a DPM state mode is a "DPM off mode" in not only a case that all DPM modes of the external source device 200 and the first external device 300 are DPM off modes as shown in FIG. 12, but also a case that one of modes of the external source device 200 or the first external device 300 is a DPM off mode.

When determining whether the received signal is a noise (S1232), the display device 100, if the received input signal is the noise, may maintain the second DPM off mode (S1233). When the display device 100 is in the second DPM off mode, if the preset time is elapsed, the display device 100 may convert the second DPM off mode to the first DPM off mode.

Figure 13:
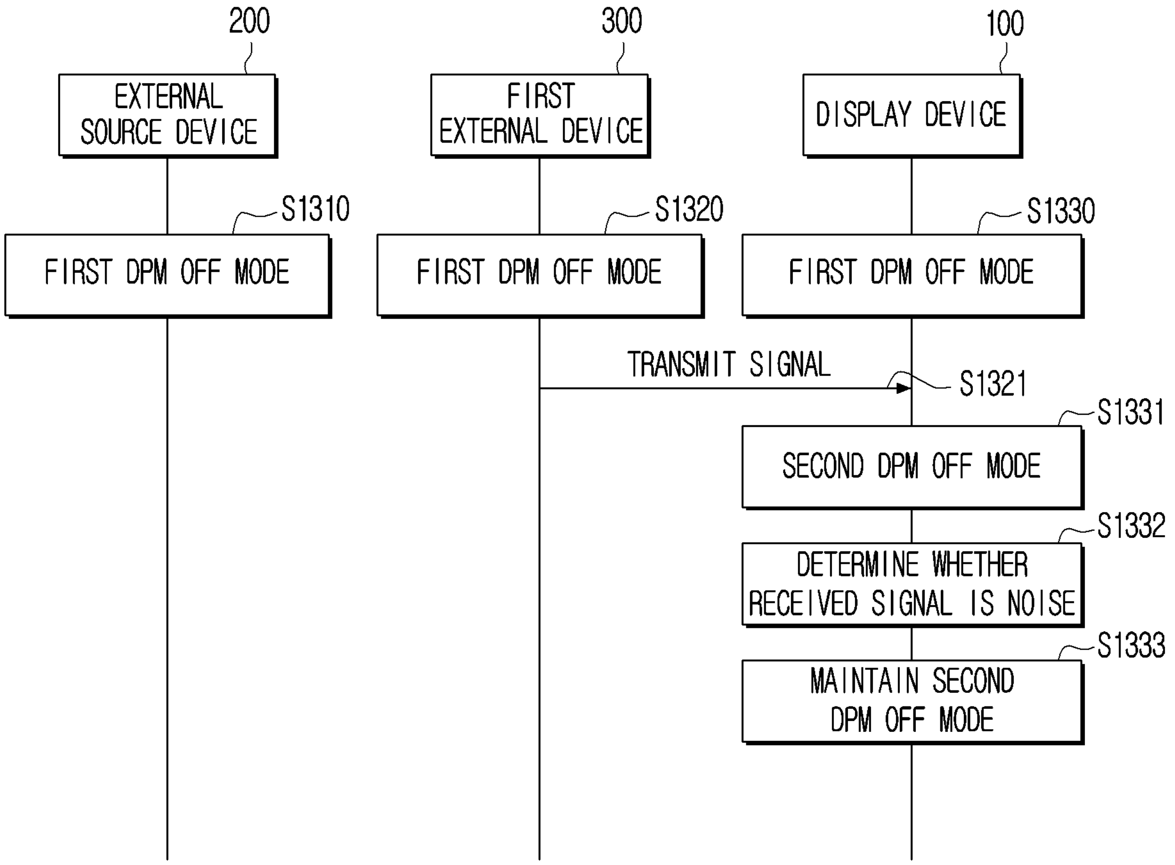

FIG. 13 is a sequence diagram illustrating operations of a display device and at least one external device connected in a daisy chain method according to various embodiments.

Meanwhile, the description of the steps S1310 to S1332 of FIG. 13 is the same as that of the steps S1210 to S1232 of FIG. 12, and thus the overlapped description is omitted.

The display device 100, if determining that the received signal is the noise signal after determining whether the received signal is the noise (S1332), may maintain the second DPM off mode (S1333).

For example, the display device 100, if an address value of the external device included in the received input signal does not correspond to an address value of the first external device 300, a mode of the external source device 200 is a DPM off mode, or a mode of the first external device 300 is a DPM off mode, may determine the received signal as the noise signal and maintain the second DPM off mode.

Figure 14:
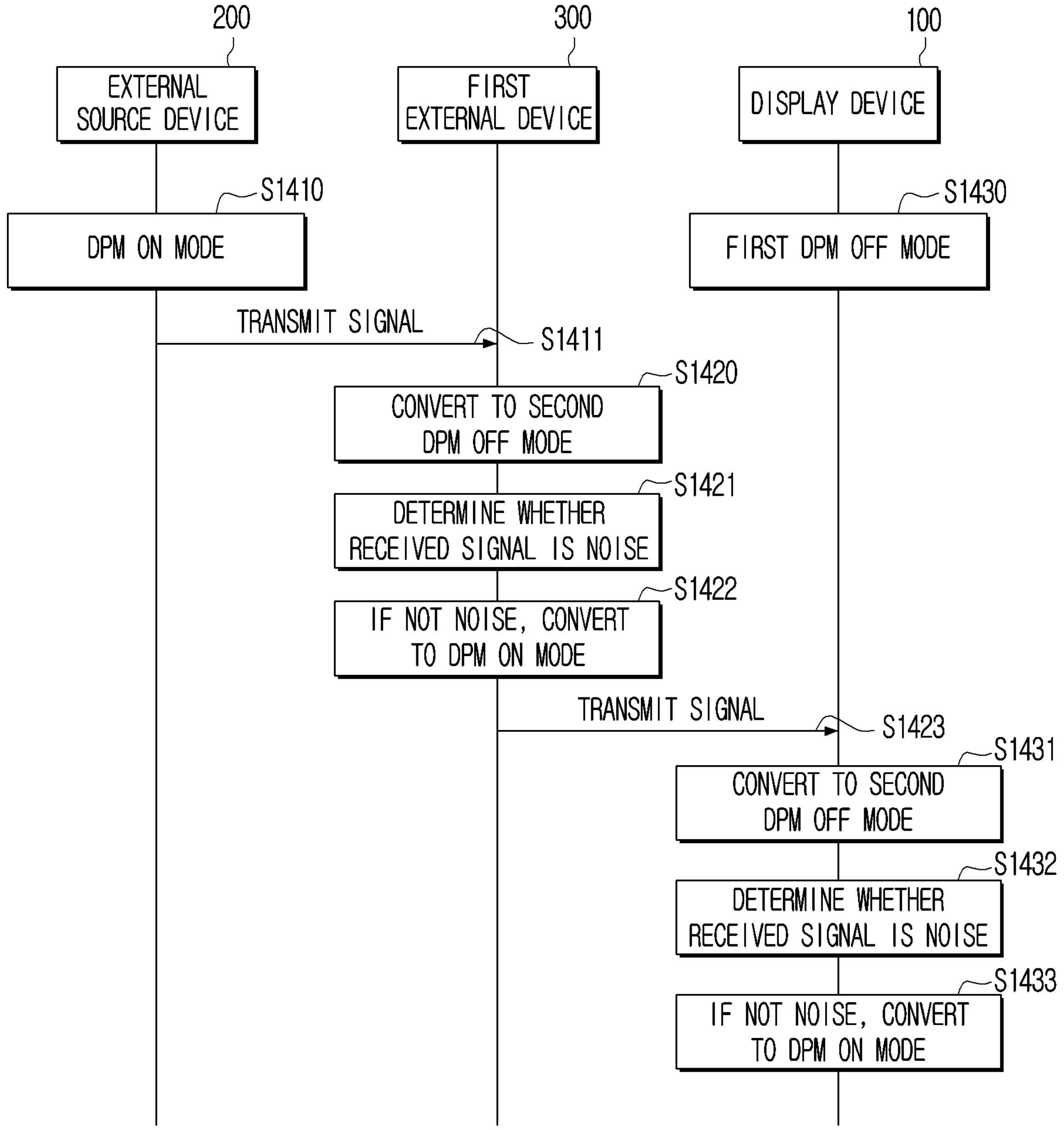

FIG. 14 is a sequence diagram illustrating operations of a display device and at least one external device connected in a daisy chain method according to various embodiments.

Differently from FIGS. 12 and 13, the display device 10 may receive a signal that is not a noise from the first external device. As shown in FIG. 14, an external source device 200 may be in a DPM on mode (S1410). The external source device 200 may transmit a signal to a first external device 300 (S1411). The first external device 300, if receiving an input signal from the external source device 200, may convert to a second DPM off mode (S1420). The first external device 300 may determine whether the received signal is a noise (S1421). The determination about whether the input signal corresponds to a noise is aforementioned and thus, is omitted. The first external device 300, if the received input signal is not a noise, may convert the second DPM off mode to a DPM on mode (S1422). If the first external device 100 does not receive a signal from the external source device 200 and the first external device, the first DPM off mode may be maintained (S1430). The first external device may transmit a signal to the display device 100 (S1423). The display device 100 may receive the input signal and convert to a second DPM off mode (S14310). The display device 100 may determine whether the received signal is a noise (S1432). The display device 100, if the received signal is not the noise, may convert the second DPM off mode to a DPM on mode (S1433).

Figure 15:
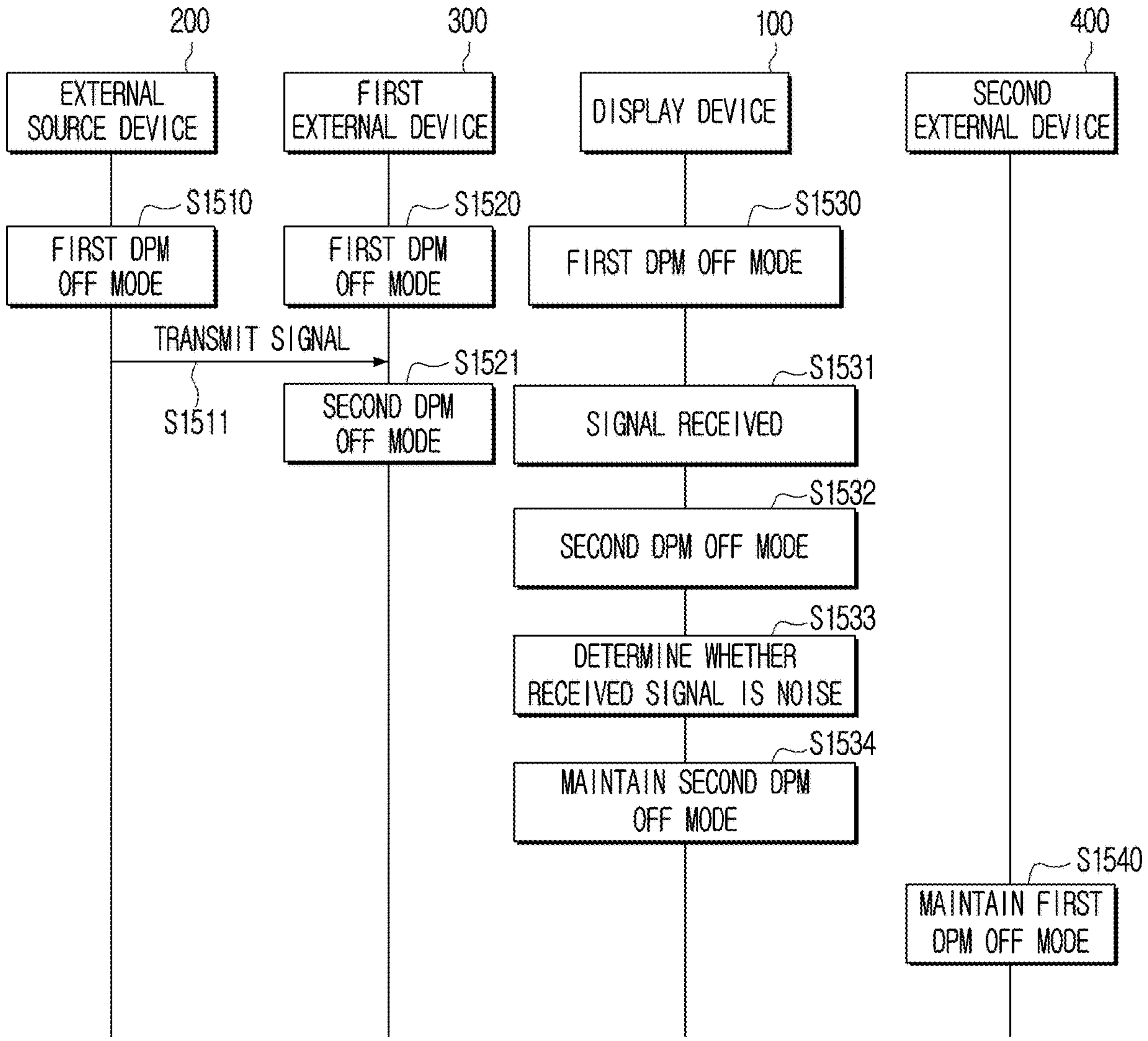
Figure 16:
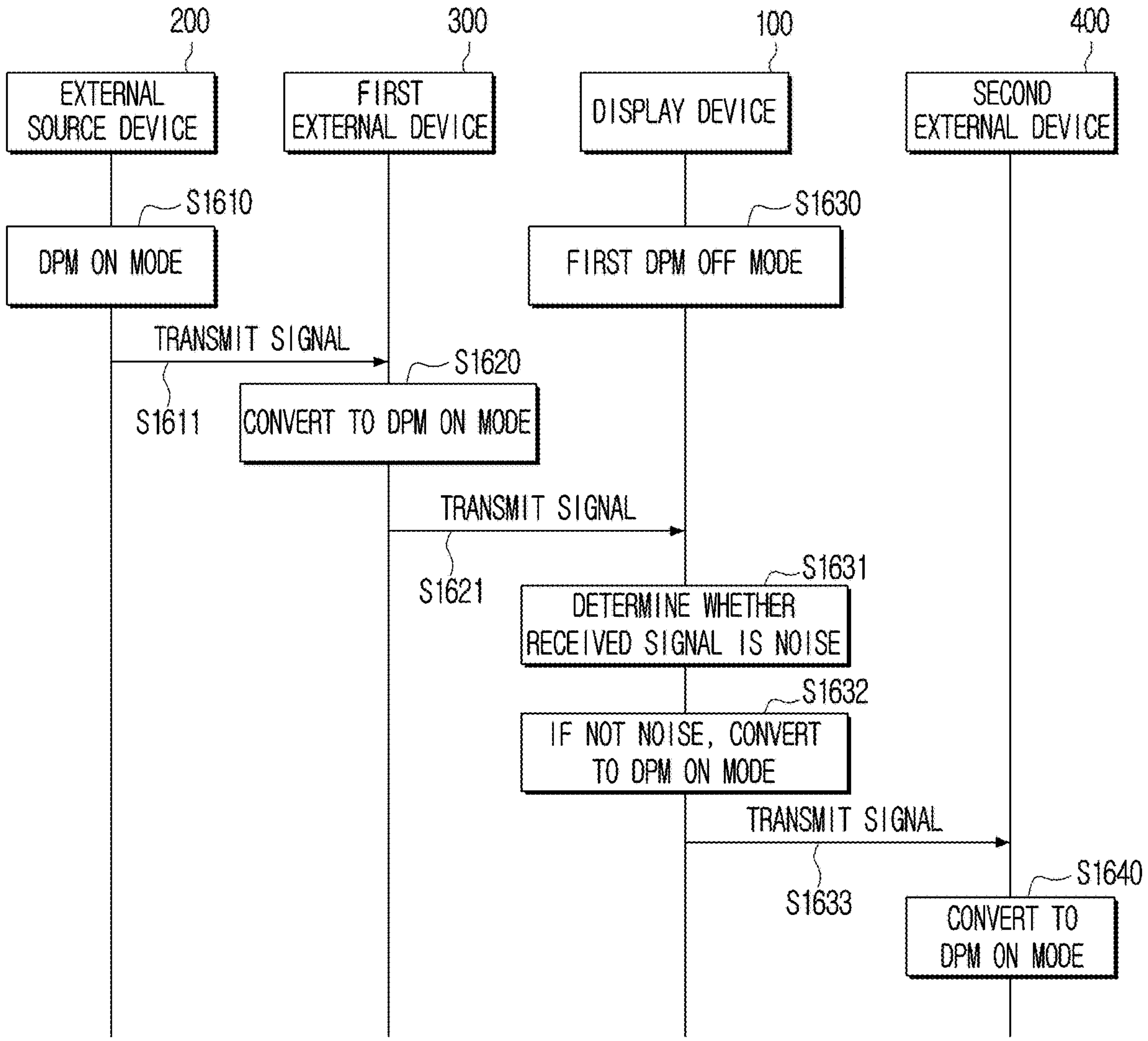

FIGS. 15 and 16 are sequence diagrams illustrating operations of a display device and at least one external device connected in a daisy chain method according to various embodiments.

As shown in FIG. 15, if an external source device 200 is in a first DPM off mode (S1510), it may transmit a signal to a first external device 300 (S1511). Here, the first external device 300 may receive a signal from the first external device 300 in a first DPM off mode (S1520) and convert to a second DPM off mode (S1521).

When the display device 100 also maintains the first DPM off mode (S1530), if a signal is received from the first external device 300 (S1531), the display device may convert to a second DPM off mode (S1532). Here, the display device 100 may determine whether the received signal is a noise (S1533), and if it is determined that the received signal corresponds to a noise signal, the display device 100 may maintain the second DPM off mode (S1534).

If the display device 100 is connected to transmit a signal to a second external device 400, the display device 100 corresponds to the second DPM off mode, and thus may not transmit the signal to the second external device 400. In this case, the second external device 400 does not receive the signal, and thus may maintain the first DPM off mode (S1540).

As shown in FIG. 16, if an external source device 200 is in a DPM on mode, a display may convert to a DPM on mode, and a second external device 400 connected in a daisy chain method may also convert to the DPM on mode.

The external source device 200 may operate in the DPM on mode (S1610). The external source device 200 may transmit a signal to a first external device 300 (S1611). Here, if the first external device 300 is set to a first DPM off mode or a second DPM off mode, it may receive a signal and convert to the DPM on mode (S1620). The first external device 300 may transmit a signal to the display device 100 (S1621). The display device 100 may be set to the first DPM off mode (S1630). The display device 100 may receive the input signal from the first external device 300 (S1621) and may determine whether the received signal is a noise (S1631). If the received input signal is not the noise, it may convert the first DPM off mode to the DPM on mode (S1632). Here, when the display device 100 is connected to transmit an image signal to the second external device 400, if the display device 100 converts to the DPM on mode after determining that the input signal is not a noise signal (S1632), it may transmit an AUX signal to the second external device 400 through a communication interface 110 (S1633).

The display device 100 may transmit the signal to the second external device 400 via a repeater IC through the communication interface. If the second external device 400 receives the signal and determines that the received signal is not a noise signal, it may convert to the DPM on mode (S1640).

Figure 17:
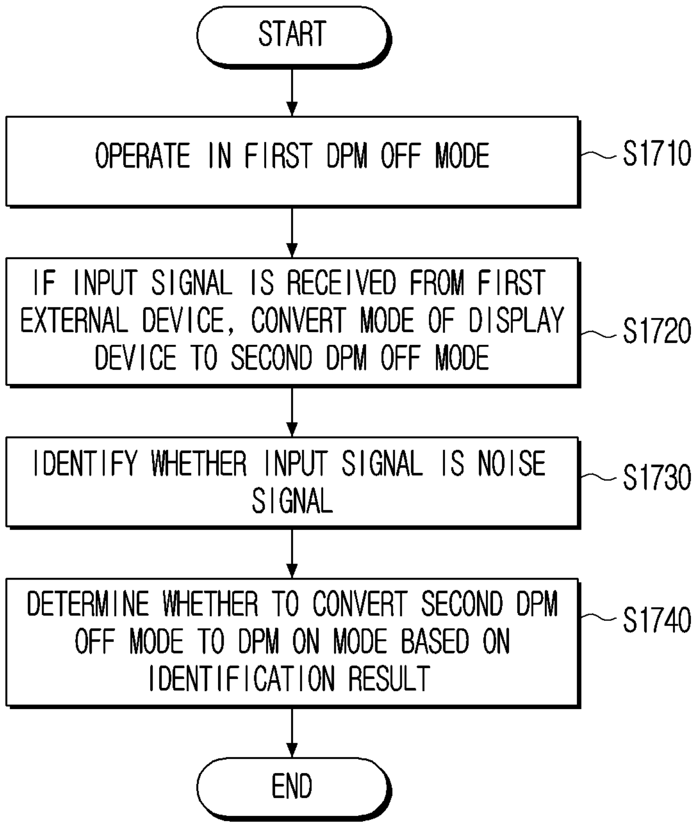
FIG. 17 is a flow chart illustrating a method of controlling a display device in accordance with an input signal according to an embodiment.

FIG. 17 is a flow chart illustrating a method of controlling a display device according to an embodiment. A display device 100 may operate in a first DPM off mode (S1710). The display device, if an input signal is received from a first external device, may convert a mode of the display device to a second DPM off mode (S1720). After converting to the second DPM off mode, the display device may identify whether the received input signal is a noise signal (S1730). The display device may determine whether to convert the second DPM off mode to a DPM on mode based on an identification result (S1740). The display device may identify whether the input signal is the noise signal based on information about an address value of the external device included in the received input signal and information about a DPM state of the external device. If the display device determines that the input signal corresponds to the noise signal, it may maintain the second DPM off mode, and if it determines that the input signal does not correspond to the noise signal, it may convert to the DPM on mode.

In the disclosure as above, when the display device 100 receives an input signal, it does not convert to a DPM on mode but goes through a process of determining whether the input signal is a noise signal after converting to the second DPM off mode, and thus there is an effect to reduce a problem of a conventional power waste.

Also, a method according to various embodiments of the disclosure may be provided to be included in a computer program product. The computer program product may be traded between a seller and a buyer as goods. The computer program product may be distributed in a form of the machine-readable storage medium (e.g. compact disc read only memory (CD-ROM)) or on-line distributed (e.g. downloaded or uploaded) via an application store (e.g. Play Store™) or directly between two user devices (e.g. smart phones). In the case of the on-line distribution, at least part of the computer program product (e.g. a downloadable app) may be stored at least temporarily or may be generated temporarily in the machine-readable storage medium such as memory of a server of a manufacturer, a server of an application store, or a relay server.

The method according to various examples of the disclosure may be implemented as software including instructions stored in the machine-readable storage medium, which can be read by the machine (e.g. a computer). The machine may refer to a device which calls instructions stored in the storage media and is operable according to the called instructions, and it may include a server device or an electronic device according to the disclosed embodiments.

Meanwhile, the machine readable storage medium may be provided in a form of a non-transitory readable recording medium. Here, the term 'non-transitory readable recording medium' merely means that the storage medium is a tangible device and does not include a signal (e.g. an electromagnetic wave), and the term does not distinguish a case where data is stored semi-permanently in the storage medium from a case where data is stored temporarily in the storage medium. For example, the 'non-transitory storage medium' may include a buffer where data is temporarily stored.

If the instructions are executed by a processor, the processor may perform a function corresponding to the instructions directly or by using other components under control of the processor. The instructions may include a code generated or executed by a compiler or an interpreter.

The above-described embodiments are merely examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of the disclosure in addition to the embodiments disclosed herein.

What is claimed is:

1. A display device comprising:

a communication interface comprising a Display Port (DP) interface, and configured to communicate with a first external device, the display device being connected to the first external device through the DP interface;

memory storing at least one instruction; and at least one processor operatively connected to the communication interface and the memory, and configured to control the display device, wherein the at least one instruction, when executed by the at least one processor, causes the display device to:

in a state in which a Display Power Management (DPM) mode of the display device corresponds to a first DPM off mode, based on an input signal being received from the first external device, changing the DPM mode of the display device to a second DPM off mode;

identify whether the input signal is a noise signal; and determine whether to change the DPM mode of the display device from the second DPM off mode to a DPM on mode based on whether the input signal is the noise signal, and wherein, in a state in which the DPM mode of the display device corresponds to the second DPM off mode, the DP interface is activated, and in the state in which the DPM mode of the display device corresponds to the first DPM off mode, the DP interface is deactivated.

2. The display device of claim 1, wherein the at least one instruction, when executed by the at least one processor, further causes the display device to:

identify whether the input signal is the noise signal based on information about an address value of an external device included in the input signal, and a DPM mode of the external device.

3. The display device of claim 2, wherein the at least one instruction, when executed by the at least one processor, further causes the display device to:

based on the address value of the external device not corresponding to a prestored address value, or based on the DPM mode of the external device corresponding to an off mode, identify the input signal as the noise signal.

4. The display device of claim 1, wherein the at least one instruction, when executed by the at least one processor, further causes the display device to:

based on the input signal being the noise signal, maintain the DPM mode of the display device in the second DPM off mode; and based on the input signal not being the noise signal, change the DPM mode of the display device to the DPM on mode.

5. The display device of claim 1, wherein the at least one instruction, when executed by the at least one processor, further causes the display device to:

in the state in which the DPM mode of the display device corresponds to the second DPM off mode, based on a signal not being received from the first external device for a preset time, change the DPM mode of the display device from the second DPM off mode to the first DPM off mode.

6. The display device of claim 1, wherein the communication interface further comprises an auxiliary (AUX) pin, and wherein the at least one instruction, when executed by the at least one processor, further causes the display device to:

receive a signal that includes information about the DPM mode of the first external device from the first external device through the AUX pin.

7. The display device of claim 1, wherein the at least one instruction, when executed by the at least one processor, further causes the display device to:

when receiving an image signal from the first external device, receive the image signal through an aux-channel of the DP interface.

8. The display device of claim 1, wherein the communication interface further comprises a plurality of interfaces including the DP interface, wherein, in the state in which the DPM mode of the display device corresponds to the first DPM off mode, the plurality of interfaces are deactivated, and wherein, in a state in which the DPM mode of the display device corresponds to the DPM on mode, the plurality of interfaces are activated.

9. A display device comprising:

a communication interface comprising a Display Port (DP) interface, and configured to communicate with a first external device and a second external device, the display device being connected to the first external device through the DP interface and the second external device;

memory storing at least one instruction; and at least one processor operatively connected to the communication interface and the memory, and configured to control the display device, wherein the at least one instruction, when executed by the at least one processor, causes the display device to:

in a state in which a Display Power Management (DPM) mode of the display device corresponds to a first DPM off mode, based on an input signal being received from the first external device, change the DPM mode of the display device to a second DPM off mode;

identify whether the input signal is a noise signal;

determine whether to change the DPM mode of the display device from the second DPM off mode to a DPM on mode based on whether the input signal is the noise signal; and determine whether to transmit the input signal to the second external device based on whether the input signal is the noise signal, and wherein, in a state in which the DPM mode of the display device corresponds to the second DPM off mode, the DP interface is activated, and in the state in which the DPM mode of the display device corresponds to the first DPM off mode, the DP interface is deactivated.

10. The display device of claim 9, wherein the at least one instruction, when executed by the at least one processor, further causes the display device to:

in a state in which the DPM mode of the display device corresponds to the DPM on mode based on the input signal not being the noise signal, transmit the input signal to the second external device through the communication interface.

11. The display device of claim 9, wherein the at least one instruction, when executed by the at least one processor, further causes the display device to:

in the state in which the DPM mode of the display device corresponds to the second DPM off mode and the input signal is the noise signal, not transmit a signal to the second external device.

12. The display device of claim 9, wherein the communication interface further comprises a plurality of interfaces including the DP interface, wherein, in the state in which the DPM mode of the display device corresponds to the first DPM off mode, the plurality of interfaces are deactivated, and wherein, in a state in which the DPM mode of the display device corresponds to the DPM on mode, the plurality of interfaces are activated.

13. A method for controlling a display device that is connected to a first external device through a Display Port (DP) interface included in a communication interface of the display device, the method comprising:

in a state in which a Display Power Management (DPM) mode of the display device corresponds to a first DPM off mode, based on an input signal being received from the first external device, changing the DPM mode of the display device to a second DPM off mode;

identifying whether the input signal is a noise signal; and determining whether to change the DPM mode of the display device from the second DPM off mode to a DPM on mode based on whether the input signal is the noise signal, wherein, in a state in which the DPM mode of the display device corresponds to the second DPM off mode, the DP interface included in the communication interface of the display device is activated, and in the state in which the DPM mode of the display device corresponds to the first DPM off mode, the DP interface is deactivated.

14. The method of claim 13, wherein the identifying whether the input signal is the noise signal comprises:

receiving information about an address value of the first external device and a DPM mode of the first external device; and identifying whether the input signal is the noise signal based on the information about the address value of the first external device and the DPM mode of the first external device.

15. The method of claim 13, the determining whether to change the DPM mode of the display device comprises:

based on the input signal being the noise signal, maintaining the DPM mode of the display device in the second DPM off mode; and based on the input signal not being the noise signal, changing the DPM mode of the display device to the DPM on mode.

16. The method of claim 13, wherein the identifying whether the input signal is the noise signal comprises:

based on information about an address value of the first external device corresponding to preset information, and a DPM mode of the first external device corresponding to the DPM on mode, identifying the input signal as not being the noise signal.

17. The method of claim 13, wherein the communication interface of the display device includes a plurality of interfaces including the DP interface, wherein, in the state in which the DPM mode of the display device corresponds to the first DPM off mode, the plurality of interfaces are deactivated, and wherein, in a state in which the DPM mode of the display device corresponds to the DPM on mode, the plurality of interfaces are activated.

18. A non-transitory computer readable recording medium storing computer instructions that, when executed by at least one processor of a display device that is connected to a first external device through a Display Port (DP) interface included in a communication interface of the display device, cause the display device to:

in a state in which a Display Power Management (DPM) mode of the display device corresponds to a first DPM off mode, based on an input signal being received from the first external device, change the DPM mode of the display device to a second DPM off mode;

identify whether the input signal is a noise signal; and determine whether to change the DPM mode of the display device from the second DPM off mode to a DPM on mode based on whether the input signal is the noise signal, wherein, in a state in which the DPM mode of the display device corresponds to the second DPM off mode, the DP interface included in the communication interface of the display device is activated, and in the state in which the DPM mode of the display device corresponds to the first DPM off mode, the DP interface is deactivated.

19. The non-transitory computer readable recording medium of claim 18, wherein the communication interface of the display device includes a plurality of interfaces including the DP interface, wherein, in the state in which the DPM mode of the display device corresponds to the first DPM off mode, the plurality of interfaces are deactivated, and wherein, in a state in which the DPM mode of the display device corresponds to the DPM on mode, the plurality of interfaces are activated.

* * * * *